W. CLAUSS.
BAKE OVEN.
APPLICATION FILED NOV. 23, 1904.
1,003,133.
Patented Sept. 12, 1911.
3 SHEETS—SHEET 2.
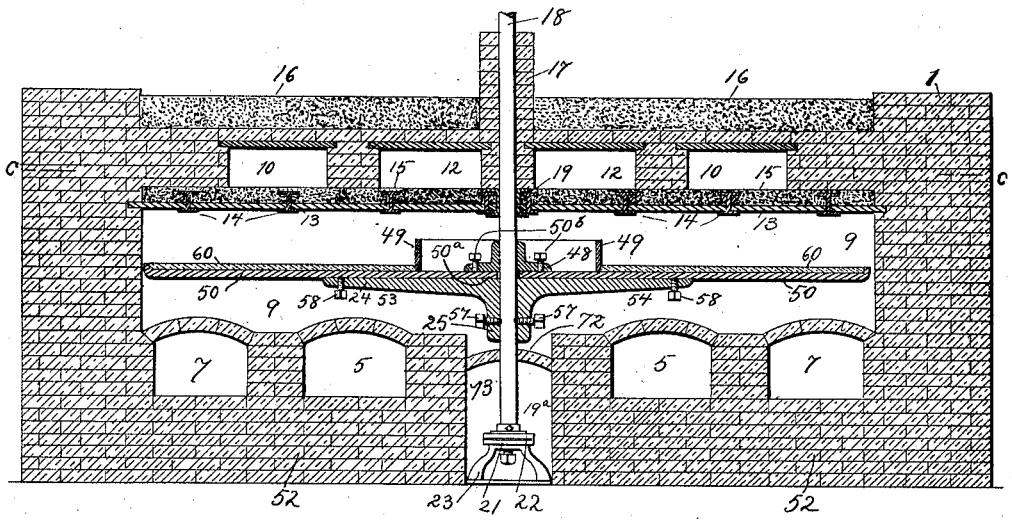
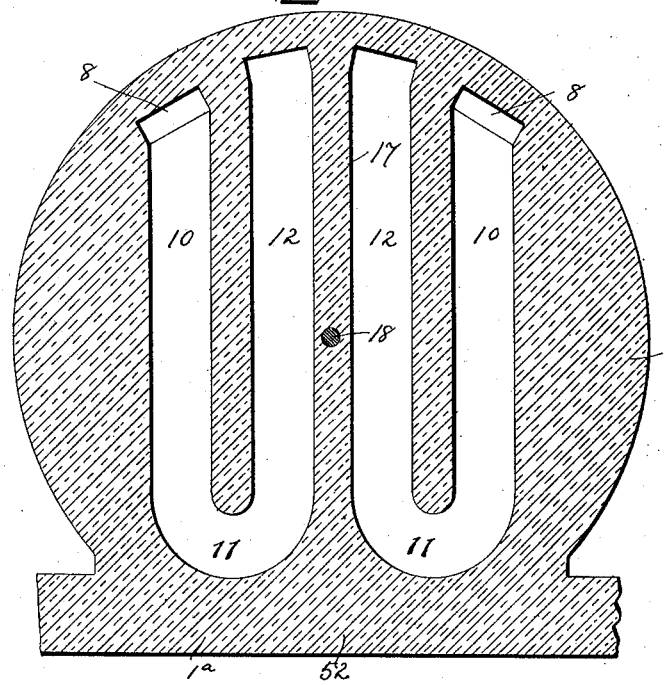

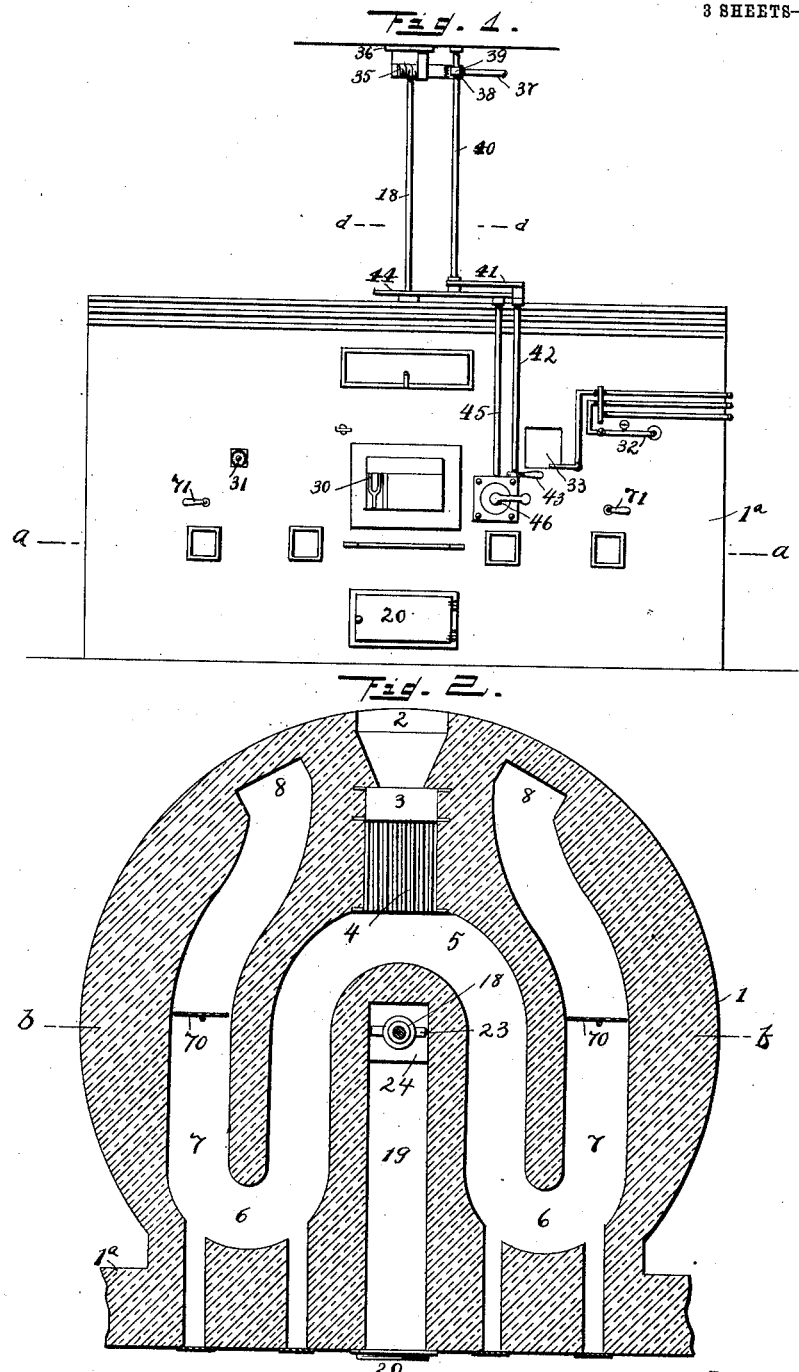

W. CLAUSS.
BAKE OVEN.
APPLICATION FILED NOV. 23, 1904.
1,003,133.
Patented Sept. 12, 1911.
3 SHEETS—SHEET 3.
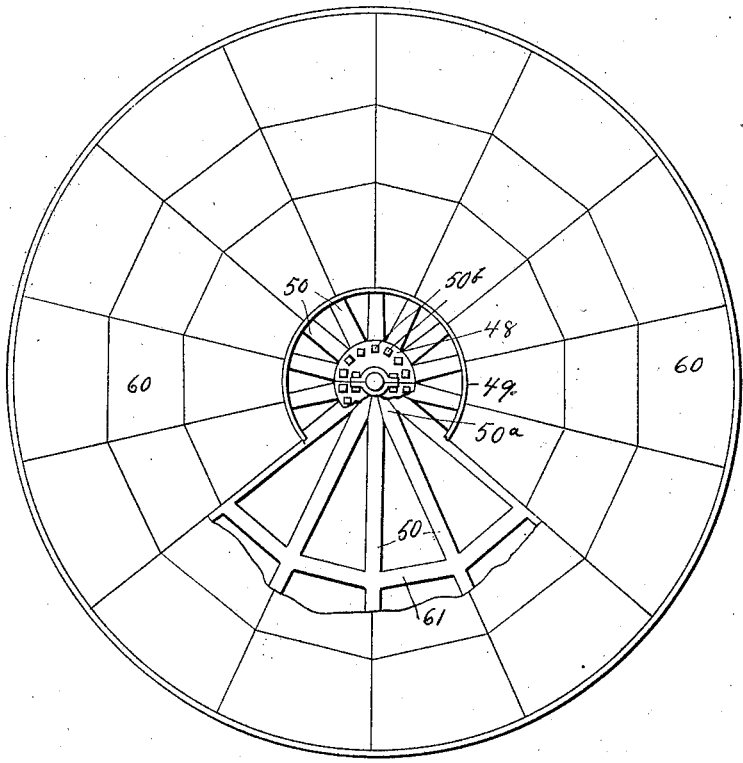
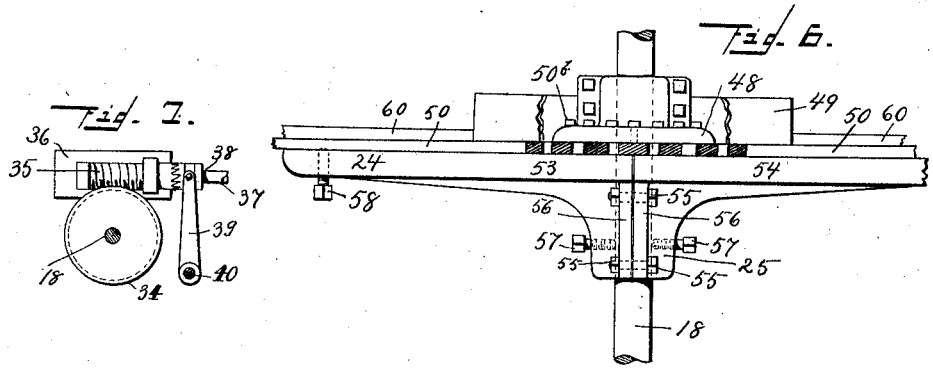

UNITED STATES PATENT OFFICE.

WILLIAM CLAUSS, OF CINCINNATI, OHIO.

BAKE-OVEN.

1,003,133. Specification of Letters Patent. Patented Sept. 12, 1911.

Application filed November 23, 1904. Serial No. 233,958.

*To all whom it may concern:*

Be it known that I, WILLIAM CLAUSS, a citizen of the United States of America, and resident of the city of Cincinnati, in the county of Hamilton and State of Ohio, have invented certain new and useful Improvements in Bake-Ovens, of which the following is a specification.

This invention relates to certain improvements in bake-ovens, and has for its object to provide an oven of an improved and simplified construction which shall afford a maximum capacity for baking purposes with a minimum of fuel consumption and in which there is for practical purposes an even or uniform distribution of heat, so that the baking is effected in a thorough and uniform manner, and the removal of the loaves or other articles from the oven and their insertion therein are accomplished in a ready and easy manner.

The invention consists in certain novel features of the construction and combinations and arrangements of the several parts of the improved bake-oven whereby certain important advantages are attained and the device is made simpler, cheaper, and otherwise better adapted and more convenient for use, all as will be hereinafter fully set forth.

The particular oven herein described belongs to the "rotary type" of ovens, and is an improvement upon the oven patented by me May 13th, 1902. It has been found in practice and from experience and experiments, that, where in an oven heated by indirect radiation, a large, spacious and deep heating or baking chamber is present, the heat dies out, making an uneven degree of heat throughout the heating or baking chamber; the natural result being, that an extra amount of fuel is needed to keep the oven properly heated, or the baking qualities are impaired. To overcome this defect in the rotary or other ovens, especially where the indirect radiation is used, is the primary object of this invention. In the most approved forms of rotary ovens now used, this object cannot be attained, inasmuch as the rotary plane or table on which the goods are baked is supported by a series of arms or braces and connecting parts which extend from the shaft in the center of the oven, up toward the edge of the baking plane, thus interfering with a proper and satisfactory construction or carrying out of this invention, as in such a case, a large, deep, spacious heating or baking chamber, must be used, so that this particular and peculiar construction can be successfully used.

In dispensing with the arms, braces and the like under the baking plane, I provide a flanged hub, which encircles the central shaft directly beneath the plane, being suitably attached to the central shaft, the flange extending out to support the baking plane.

I will describe the oven and its parts very fully so that my invention will be more readily understood.

In the accompanying drawings, which serve to illustrate my improvements, Figure 1 is an elevation showing a bake-oven constructed according to my invention; and Fig. 2 is a section taken transversely and horizontally through the same in the plane indicated by the line $a\ a$ in the Fig. 1, being taken through the flues and fire-chamber at the lower part of the oven. Fig. 3 is a sectional view taken vertically through the improved oven in the plane indicated by the line $b\ b$ in Fig. 2. Fig. 4 is a transverse section similar to Fig. 2, but taken horizontally through the improved bake-oven in the plane indicated by line $c\ c$ in the Fig. 3, being taken through the smoke-flues at the upper part of the improved oven. Fig. 5 is a view showing in plan the rotating plane or part for supporting the loaves or other articles in the baking-chamber, part of the surface of the same being broken out to show the underlying parts. Fig. 6 is a detached view of the supporting hub and flange used to support the baking-plane, certain parts being broken away. Fig. 7 is an enlarged detail view showing the gearing for driving the rotatory plane or part, being an inverted sectional plan view taking in the plane indicated by line $d\ d$ in Fig. 1.

As clearly shown in the drawings, and above stated, the improved oven is of the rotary class or type and is constructed with a circular wall 1, the front portion of which is, especially where a plurality of ovens are joined in the battery, merged in a straight front wall 1ª, wherein the doors of the various chambers and flues are set, shown in Fig. 1. 2 indicates the charging-door of the fire-box, this being arranged at the back of the circular part of the improved bake-oven and opposite to the said straight front wall, and 3 indicates a dead-plate, and 4 the grate-bars in the said fire-box.

5 5 indicates flues or passages for the products of combustion from the fire-box, and these are curved or bent away from each other toward opposite sides of the center of the circular body of the oven, being separated from each other by a thickened partition-wall, as clearly seen in Fig. 2, and being extended forward or toward the front wall of the oven upon the opposite sides of the said partition-wall. Near the front of the oven these flues 5 5 are curved or bent outwardly or away from each other and are connected with other similar flues or passages 7, which extend outside of the same plane, with and are substantially parallel with the said flues or passages 5.

6 6 indicates the bends or curves which connect the forward ends of the flues 5 and 7.

The rear ends of the outer flues or passages 7 7 are curved or bent slightly toward each other upon opposite sides of the fire-box and are extended into the rear part of the circular wall of the oven, being made of as great length as possible in order that as much as possible of the heat from the products of combustion passing through the flues may be absorbed by the walls thereof, so as to give increased efficiency to the oven. The rear ends of the said outer flues or passages 7 7 communicate with upwardly-extended flues 8 8, formed in the outer circular wall of the oven upon opposite sides of the charging-door 2 and extended up past the baking-chamber 9, which is formed within the body of the oven above the plane of the lower flues 5 and 7. The said lower flues 5 and 7 are tightly walled or arched over to prevent the escape of gases from them into the baking-chamber 9.

Above the baking-chamber the upwardly extended flues 8 8 are adapted for communication with the other upper flues or passages 10 10 at the opposite sides of the body of the oven, these flues 10 10 being arranged as shown in Figs. 3 and 4 and extended from the rear to the front of the improved oven and being formed with bent or curved forward ends 11 11, which are extended toward each other and which communicate with other inner flues 12 12, separated from said outer flues 10 and also from themselves by partitions, as clearly shown in said figures. The said inner flues 12 12 lie in the same plane with and are parallel to the flues 10 10, and at their rear ends said inner flues are adapted for communication with a smoke-outlet of any preferred kind. The upper flues 10 and 12 above the baking-chamber 9 are separated from said baking-chamber by the roof thereof, which is formed of tiles 13, supported upon metal beams 14 in a well-known way and overlaid with concrete or cement, as shown at 15, to prevent the downward passage of gases from said upper flues into the baking-chamber.
17 indicates the partition-wall, which divides the inner flues 12 12 from each other, and this partition-wall is extended above the top of the oven-body, as clearly shown in Fig. 3, and a shaft 18, arranged axially with respect to the circular body of the oven, is extended down through it. This raised wall 17 serves to prevent the entry of the particles of grit or the like to the bearings of shaft, the top of the oven being covered over with a layer of sand 16 in order to increase its heat-retaining qualities, which sand, but for the presence of said raised wall 17 or its equivalent, would be drawn down around the shaft into its bearings.

The above construction of flues describe an indirect system of heating or radiation and in the oven just described and ovens of a similar type now in vogue, the lower set of flues begin at the ground or on the base on which the oven is constructed or on the foundation on which it rests; this being the case a deep, spacious heating or baking-chamber is left above them, because the peculiar system of supporting the rotary baking plane prohibits any other form of construction. By using my hub or flange to support the baking plane and dispensing with the objectionable under supports now used, I can elevate the lower flues and instead of beginning them at the base or foot of the oven, I provide or construct a base or foot wall solidly under the whole oven and then build the flues from this base or wall upward. This base, wall or elevation foundation is indicated by the figures 52 (see Fig. 3). This elevation 52 can be made of brick, concrete or any suitable material. The result is the narrow, shallow, and contracted heating or baking-chamber. This baking-chamber is designated by the figure 9. The baking or heating-chamber, of course, extends both above and below the rotary baking plane. The part of the baking or heating-chamber which is referred to herein as being made narrow or shallow by the new construction is the part below the rotary plane. It will be readily seen, that by this construction uniformity of heat can be easily maintained, the heating or baking-chamber will always be full of active heat, the consumption of fuel will be cut down to a minimum, the multiplicity of brick present in the elevated foundation will retain a great and steady heat, thus insuring an ideal heating or baking-chamber for the oven.

16 indicates the layer of sand or the like upon the top of the oven.

The shaft 18 has an upper bearing 19, formed of a flanged collar, the flanges of which are rested upon two closely adjacent metal beams 14 at the central part of the roof of the baking-chamber, as shown in Fig. 3. The lower end of the said shaft is extended down within the partitions between the flues 5 5 at the base of the oven and stands within a chamber 19ª, formed in said partition, said chamber being in the nature of a passage which is extended to the front wall of the oven and has a door 20, as shown in Figs. 1 and 2, through which access may be had thereto. The lower end of the shaft 18 extends into and is connected with a roller bearing mechanism 21, 22, (the roller not being shown) placed at the bottom of the shaft and supported by stirrup 23 (see Fig. 3). Any specific form of well known roller bearing mechanism may be used, so no specific form need be described.

30 indicates the door of the baking-chamber 9, said door being, as clearly shown in Fig. 1, formed in the straight front wall of the oven. 31 indicates a pyrometer set on the said front wall for indicating the temperature in the baking-chamber, and 32 indicates an arrangement of steam-pipes for admitting steam to said chamber for service in the operation of the oven. 33 indicates an opening for a lamp, by means of which the interior of said chamber may be illuminated for inspection.

The upper end of the shaft 18 carries a worm-wheel 34, as shown in Fig. 7, and said worm-wheel is in mesh with a worm 35, held in a bearing-bracket 36, secured above the oven, a shaft 37 being provided for driving said worm from a suitable source of power, which is transmitted through a clutch member 38, slidable on shaft 37 and actuated by means of an arm 39 from a vertical shaft 40, which is extended above the top of the oven and which has at its lower end a connection 41 with a second shaft 42, journaled in bearings upon the front wall of the oven and provided near its lower end with a handle 43, by means of which it may be rocked for throwing the clutch member back and forth and into and out of driving position. The shaft 18 has also near the top of the oven a gear connection, preferably in the nature of a link belt and chain-wheels, as shown at 44, with a shaft 45, also journaled in the bearings upon the front wall of the oven and adapted to be driven from a crank-handle 46. By this means it will be seen that the shaft 18 may be driven from power or by manual means at will.

If desired the central shaft may be properly connected to an electric or other kind of motor and the oven operated by electricity or the like.

In the baking-chamber 9 and near the upper part thereof is arranged the rotatory plane or part upon which the loaves or articles to be baked are supported during the operation of the improved bake-oven, and said rotatory plane or part is set horizontally, and is of circular form, being slightly less in diameter than the baking-chamber wherein it turns, so that the hot air passes upward around the edges. The said part or plane is secured upon and is rotated from the vertical shaft 18 and comprises a frame-work formed of radial arms or bars 50, of metal, tapered toward their outer ends, so that their weight may be lessened as much as possible consistent with their required strength, and also having their inner ends tapered, as shown in 50ª, so that they may fit together adjacent to and around the shaft similarly to the spokes of a wagon-wheel. The tapered inner ends 50ª of the arms or bars 50 are fitted between a spaced collar 48 secured upon the central shaft in any desired manner, (the collar being formed as shown in Figs. 5 and 6 from two parts or sections bolted together), and the flanged hub 25 upon which the bars 50 rest and are supported. The collar 48 carries a series of set-screws 50ᵇ adapted to bear on the ends 50ª of the arms or bars 50 to hold them from disengagement with the collar.

The rotary plane on which the goods are baked and which is located in the baking-chamber in which it revolves, is supported on a large flanged hub, made of two parts 53, 54, which encircle the shaft 18 and are tightly bolted together around said shaft by bolts and nut connections 55 passing through ribs 56 on the flanges of parts 53 and 54. Set-screws 57 are screwed through the hub 25 into recesses in shaft 18, so as to firmly and rigidly hold the flanged hub on the shaft 18. This flanged hub and its connections are made to fit snugly and tightly, and the parts are made strong and of good material in order to evenly and uniformly support the baking plane.

The flange of the hub may extend out as far under the arms which make up the frame-work of the baking plane as desired. Of course the flanged hub may be made of any shape and connected to the central shaft in any desired manner. It will readily be observed that this flanged hub will properly support the rotary plane, take up little room, be cheap of manufacture and enable me to provide a shallow baking-chamber under the rotary plane. Near the outer periphery of the flange 24 of the hub 25, I provide set-screws 58. These set-screws 58 pass through the flange, and at their inner edges impinge against the under side of arms 50, so that when any of said arms gets out of proper alinement or uneven with the rest of the arms, they can be lowered or elevated by these set-screws 58, thus the surface of the baking plane is kept even. If desired the flange hub may be made of one piece or of more parts, just as desired.

The surface of the rotatory plane or part is formed from soap-stone or other suitable material, and this surface, as indicated at 60 in the drawings, is formed into a number of segments, which are fitted between the arms or bars 50, whereon they rest, and are held in place by any suitable means, to prevent them from slipping.

To brace the outer ends of the arms or bars 50 against lateral strains, transverse parts 61 are provided, which extend between said arms.

49 indicates an annular band or ring of metal, which band is secured upon the framework of the rotatory plane and forms an upwardly-extended central flange surrounding the shaft to prevent the articles placed on the said plane from being pushed too near said shaft.

Another feature of my invention consists in placing dampers 70, 70, in the lower flues of the system, which dampers 70, 70, are operated from the outside of the oven by the damper rods 71, 71, (see particularly Figs. 1 and 2). The object of placing these dampers in these flues is as follows. When it is desired to bake sugar-kisses and macaroons and other similar delicate cakes and confections it must be done by a direct heat, either incandescent or flash heat, as they must be baked quickly. In indirect heating ovens as now used, these confections cannot be baked as the heat is not direct, no flash heat can be produced. In order to produce this flash heat, I provide the dampers in the lower flues, and when I am using the oven by the indirect heating system, the dampers are left down, as this will not interfere with the indirect radiation, but when it is desired to bake these confections and delicate cakes, the fire is allowed to reach an incandescent state, the cakes are then put in on the baking-plane, the dampers 70, 70, are lifted and the heat flashed up into the baking-chamber and the heating and baking of the confections and cakes accomplished. The dampers can then be dropped and the regular baking continued. It will thus be seen that from an indirect radiation, I can change the oven to a direct heater for the purposes set forth.

72 represents an arch over the chamber or space 19$^a$, which is present so that ingress and egress can be had to the shaft 18 and the ball bearing mechanism 21, 22 and the stirrup 23. By providing this arch, I am enabled to reach the shaft and connections present in this space 19$^a$.

In the operation of the improved bake-oven a charge of fuel is first placed in the fire-box and lighted, and after it has burned sufficiently high the drafts are partially closed to prevent the fire from burning out too fast. As soon as the baking-chamber is sufficiently hot, the bread or articles to be baked are placed upon the rotary plane or part and the shaft 18 is set in motion, either by hand or mechanical means, so that the loaves carried on the plane are exposed to the heat in the baking-chamber in a thorough and uniform way, whereby the operation of the baking is greatly facilitated and the result much improved. The arrangement of the flues or passages for the products of combustion is such that the heat is distributed in a uniform and even manner throughout the oven, so that all parts of the baking-chamber are of equal heat, and the arrangement is also such that the heat is retained within the oven for a long time, so that a very material economy is effected in the use of the fuel. Moreover the rotary plane or part on which the loaves are carried is located near the top of the baking-chamber, so that the steam and vapors given off from them, do not rise above the articles being baked, but are merely diffused about them, so that the flavor is prevented from being lost during the baking operation.

The operative parts of the oven are of such nature that very little power suffices to turn the plane or part on which the articles to be baked are carried, so that the device is capable of being very readily and quickly manipulated either during the baking operation or during the removal or insertion of the loaves within the oven.

My improved method of providing a shallow baking chamber underneath the rotary plane, can be adapted to other description of flues than those herein set forth. My method of supporting the rotary plane by means of a flanged hub carrying adjustment screws may be used with rotary planes of a description other than herein set forth.

What I claim as new and of my invention and desire by Letters Patent is:

1. In a rotary oven comprising a baking chamber, an upper and lower set of flues, a shaft passing vertically through said chamber, upper and lower hub members mounted on said shaft in the baking chamber, radial arms having their inner ends connected between said hub members, and supported wholly thereby, and means carried directly by the hub members for adjusting the arms vertically, so that the rotary plane will present an even baking surface.

2. A rotary oven, comprising a baking chamber, a shaft passing vertically through said chamber, upper and lower hub members mounted on the shaft, radial arms supporting the bed of the oven, said arms having their inner ends confined between the hub members and supported wholly thereby, and means carried by one of the hub members engaging the inner ends of said arms to tilt them on the lower hub member and effect a vertical adjustment of their outer ends.

3. In a rotary oven, comprising a shallow baking chamber, an upper and a lower set of flues, a shaft passing vertically through said chamber, upper and lower hub members mounted on the shaft in the shallow baking chamber, radial arms supporting the bed of the oven, said arms having their inner ends connected between said hub members and supported wholly thereby, and means carried by one of said hub members and passing through said hub member to engage the radial arms to effect a vertical adjustment of the radial arms so as to present an even and uniform baking surface, as set forth.

Signed at Cincinnati, Ohio, this 1st day of September, A. D. 1904.

WILLIAM CLAUSS.

Witnesses:
A. HECTEN COOPER,
KATIE M. STREHLI.

Copies of this patent may be obtained for five cents each, by addressing the "Commissioner of Patents, Washington, D. C."